United States Patent

[11] 3,602,276

| [72] | Inventors | Andrew M. Kvalheim<br>823 Petaluma Blvd. S., P.O. Box 77;<br>Irwin S. Kvalheim, 823-825 Petaluma<br>Blvd. S., P.O. Box 77, both of Petaluma,<br>Calif. 94952 |
|---|---|---|
| [21] | Appl. No. | 782,643 |
| [22] | Filed | Dec. 10, 1968 |
| [45] | Patented | Aug. 31, 1971 |

[54] PANEL-GROOVING APPARATUS
13 Claims, 13 Drawing Figs.

[52] U.S. Cl............................................. 144/136,
144/3, 144/309
[51] Int. Cl............................................. B27c 5/00
[50] Field of Search......................................... 144/136,
121, 122, 117, 2, 3, 309, 247

[56] References Cited
UNITED STATES PATENTS
1,302,718   5/1919   Sawyer............................   144/247
1,639,485   8/1927   Carlson............................   144/136
2,100,566   11/1930   Munding.........................   144/136
2,918,096   12/1959   Schiel.............................   144/136 X
3,353,574   11/1967   Kvalheim........................   144/2

*Primary Examiner*—Donald R. Schran
*Attorneys*—Keith Misegades and George R. Douglas ABSTRACT: The invention is a panel-grooving apparatus for treating the surface of a wood panel or the like, comprising a frame structure having a work bed and banks of feed rollers therein for transporting panels through the device, and a reciprocating cutter mechanism which has banks of routers thereon for cutting various designs in the undersurface of a panel passing thereover. An unique feed roller system includes means for moving the rollers aside in the vicinity of the cutter mechanism for access to the cutter mechanism. Means are provided allowing movement of the cutter along three axes. The cutters may be replaced by burners, scribers, or other apparatus to pattern the panel surface as desired. Finally, means are provided for painting or staining the grooves.

INVENTORS
ANDREW M. KVALHEIM
IRWIN S. KVALHEIM

BY
ATTORNEY

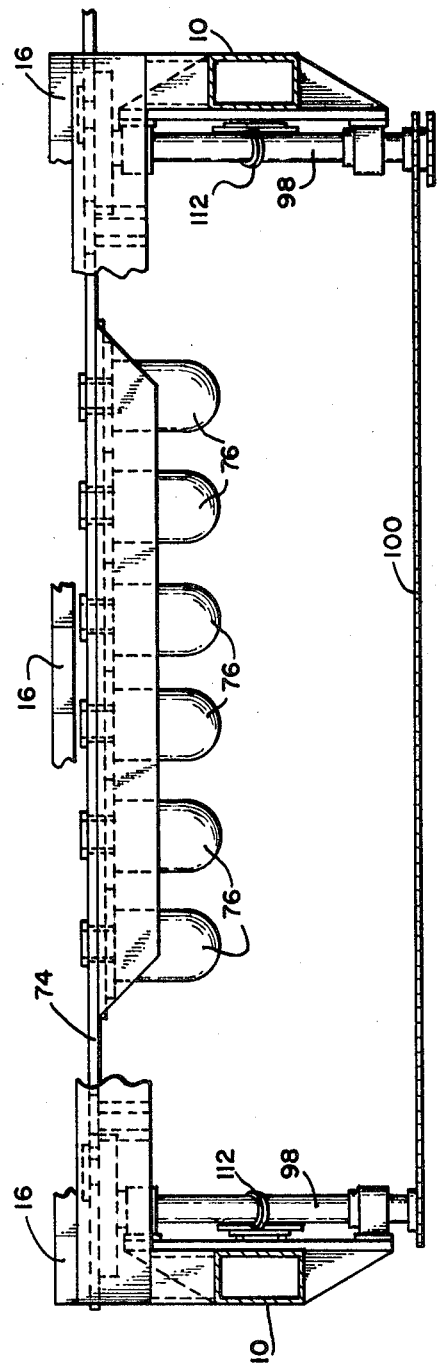

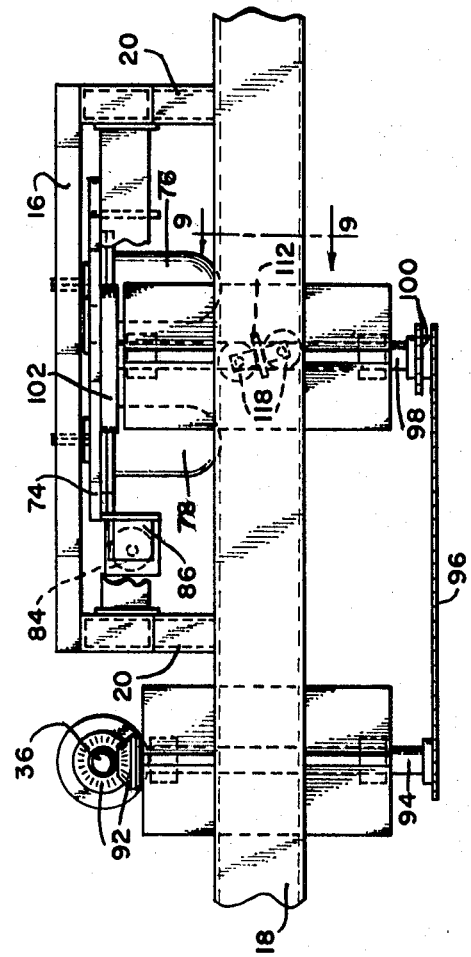
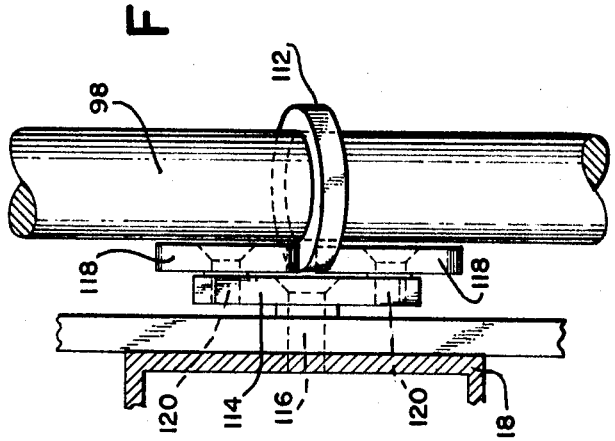
FIG.10
FIG.9
INVENTORS
ANDREW M. KVALHEIM
IRWIN S. KVALHEIM
BY *Keith Misegades*
ATTORNEY

FIG. 13
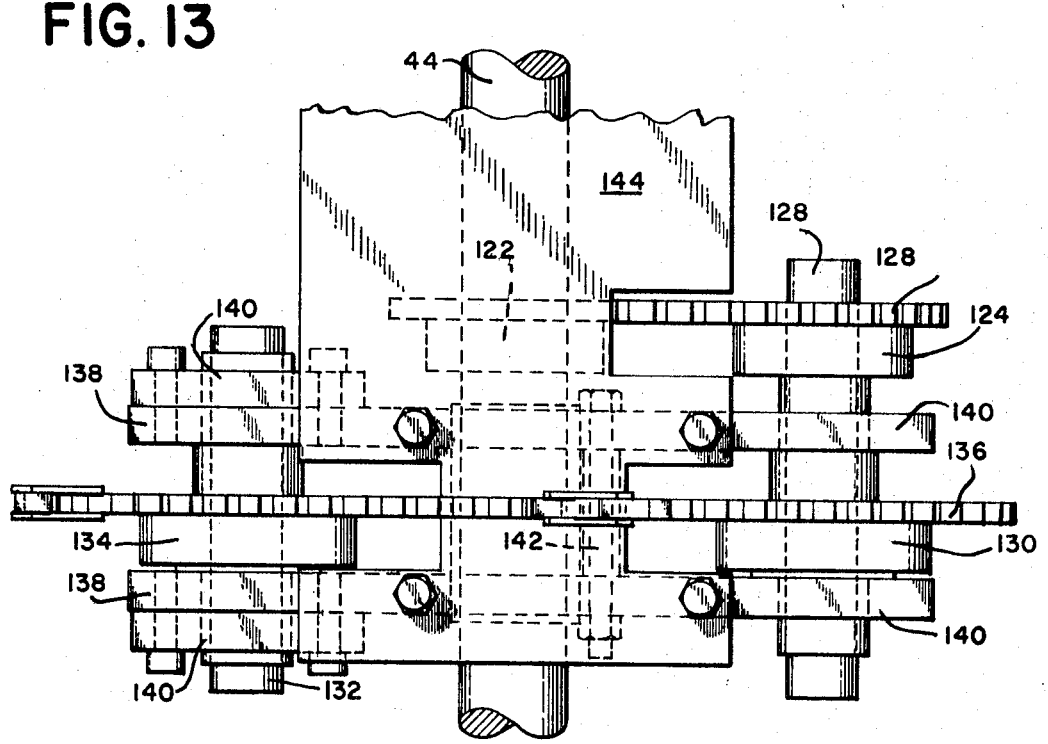
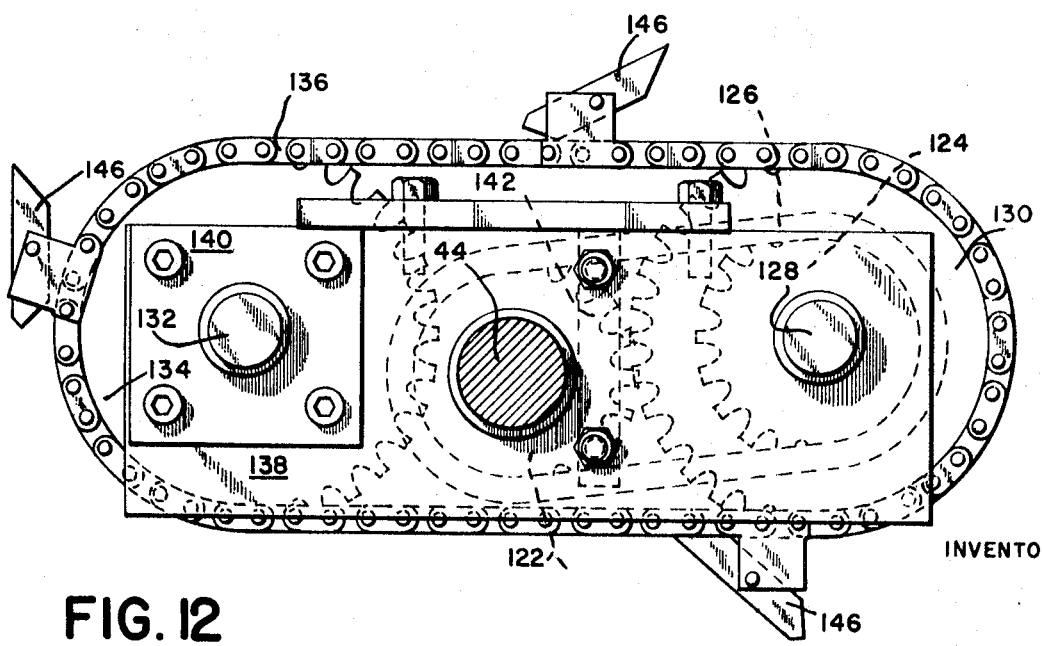
FIG. 12
INVENTORS
ANDREW M. KVALHEIM
IRWIN S. KVALHEIM
BY *Kirk Misegades*
ATTORNEY

PANEL-GROOVING APPARATUS

BACKGROUND OF THE INVENTION

The invention relates generally to the art of scribing pleasing aesthetic designs in the surface of a panel of wood or like material, and particularly presents a solution to the problem of scribing a variety of designs, automatically, into the panel surface, and changing the configurations of such designs simply and easily.

Our prior U.S. Pat. No. 3,353,574, illustrates a basic machine in the art, which includes a frame, worktable and feed rollers for directing a panel through the invention, and further includes a pair of reciprocating cutter bars for scribing a rough-hewn appearance into the panel surface. This invention is limited only in that movement of the cutting means is within a single, horizontal plane.

Other prior patents peripherally related to the instant invention include U.S. Pat. No. 2,030,520, issued to Gus Heimsath, which discloses a plurality of rotary power planes, movable against, and away from, a panel surface. No scribing features are disclosed. U.S. Pat. No. 2,667,193, issued to C. A. Sherman, illustrates a plywood patch machine including a template-guided router. Again, the object of this invention is to correct irregularities in a panel surface, rather than to create them.

U.S. Pat. No. 2,907,359, describes a panel-grooving machine, but the invention creates only a series of straight lines in the panel surface instead of the varied designs which may be created by the instant invention, as will be described below. Finally, U.S. Pat. No. 3,207,192, issued to L. B. Dennison indicates a shingle-grooving machine which permits the grooving of the thicker end of the shingle only, so that integrity of the shingle is assured. However, no provision for varying the design of a series of straight lines is shown.

The instant invention makes a significant contribution to the art by providing a panel-grooving machine that may cut straight lines, curved lines, a braid pattern, or a countless variety of other designs into a panel surface. The cutting or grooving means is sequentially timed with the panel feeding rollers so that a continuous, uniform design may be applied in any one operation. Additionally, the feed rollers adjacent the work area of the machine may be removed to deactivate automatic operation of the invention, so that special handwork designs may be applied.

SUMMARY OF THE INVENTION

The invention is a panel-grooving apparatus including a frame, feed rollers, and a central work area, and includes means permitting removal of top feed rollers immediately adjacent the central work area. A movable cutter support plate is located beneath the central work area, for cutting designs into the bottom surface of a panel passing through the invention, being provided with a stationary bank of routing or cutting means, a forward, movable bank of cutters, eccentric drive means for moving the support plate, means for vertically moving the support plate during a scribing operation, restricting wheel means permitting circular motion of each cutting means in both banks of routers, and an indexing system assuring proper feed of the panels with respect to the cyclical operation of the cutters or routers. Means for painting or staining the grooves may be provided.

BRIEF DESCRIPTION OF THE DRAWINGS

Details of construction and operation according to preferred embodiments of the invention, as well as fuller and more complete objects and advantages of the instant invention will become readily apparent by reference to the following specification and drawings wherein:

FIG. 8 is a partial, sectional view taken along lines 8—8 of FIG. 1, with parts broken away to show interior detail;
FIG. 9 is a partial, sectional view taken along lines 9—9 of FIG. 10;
FIG. 10 is a partial end view of the invention as shown in FIG. 8, and taken from the right side thereof;
FIG. 12 is a sectional view taken along lines 12—12 of FIG. 2;
and
FIG. 13 is a top, partial plan view of the portion of the index feeding means illustrated in FIG. 12.

DESCRIPTION OF THE PREFERRED EMBODIMENTS

Figure 1:
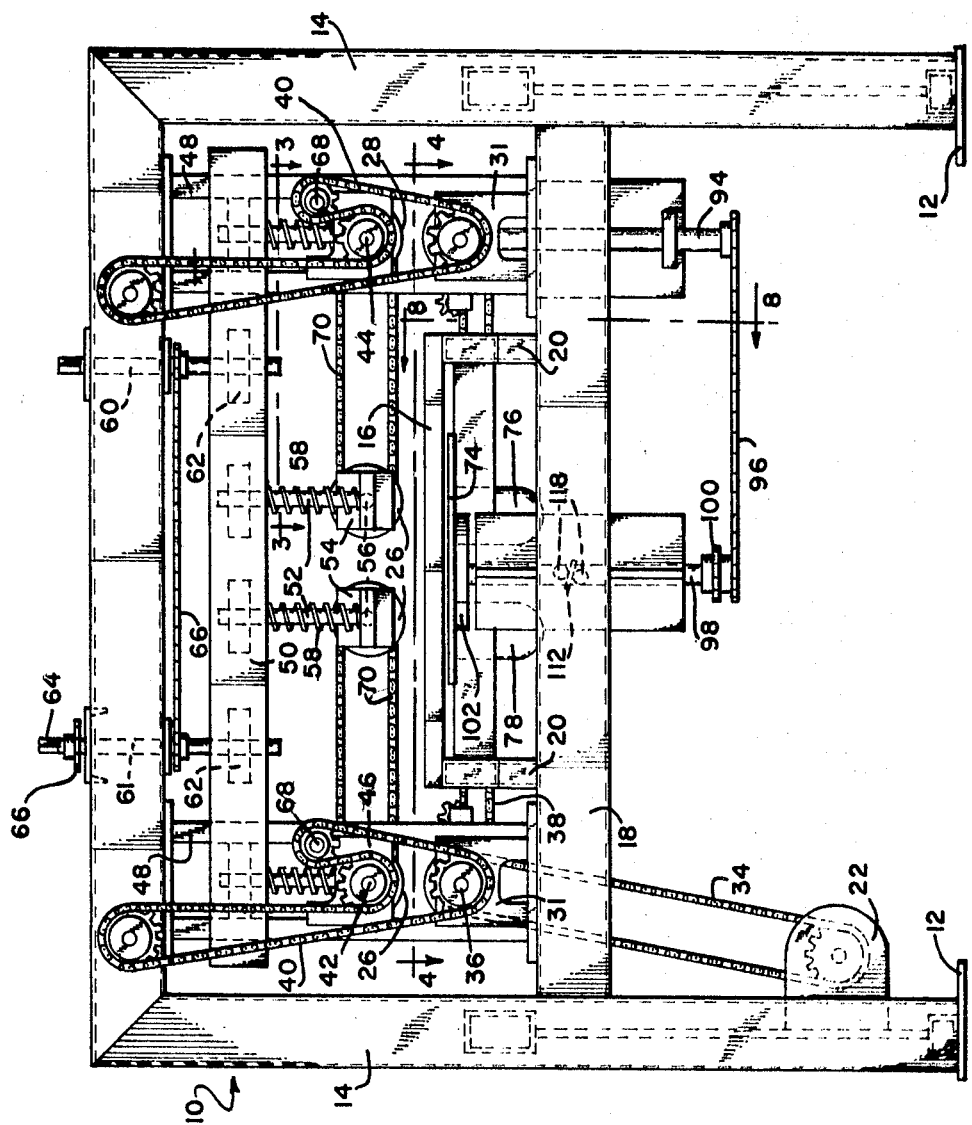
FIG. 1 is a side, elevational view of the invention.
Figure 2:
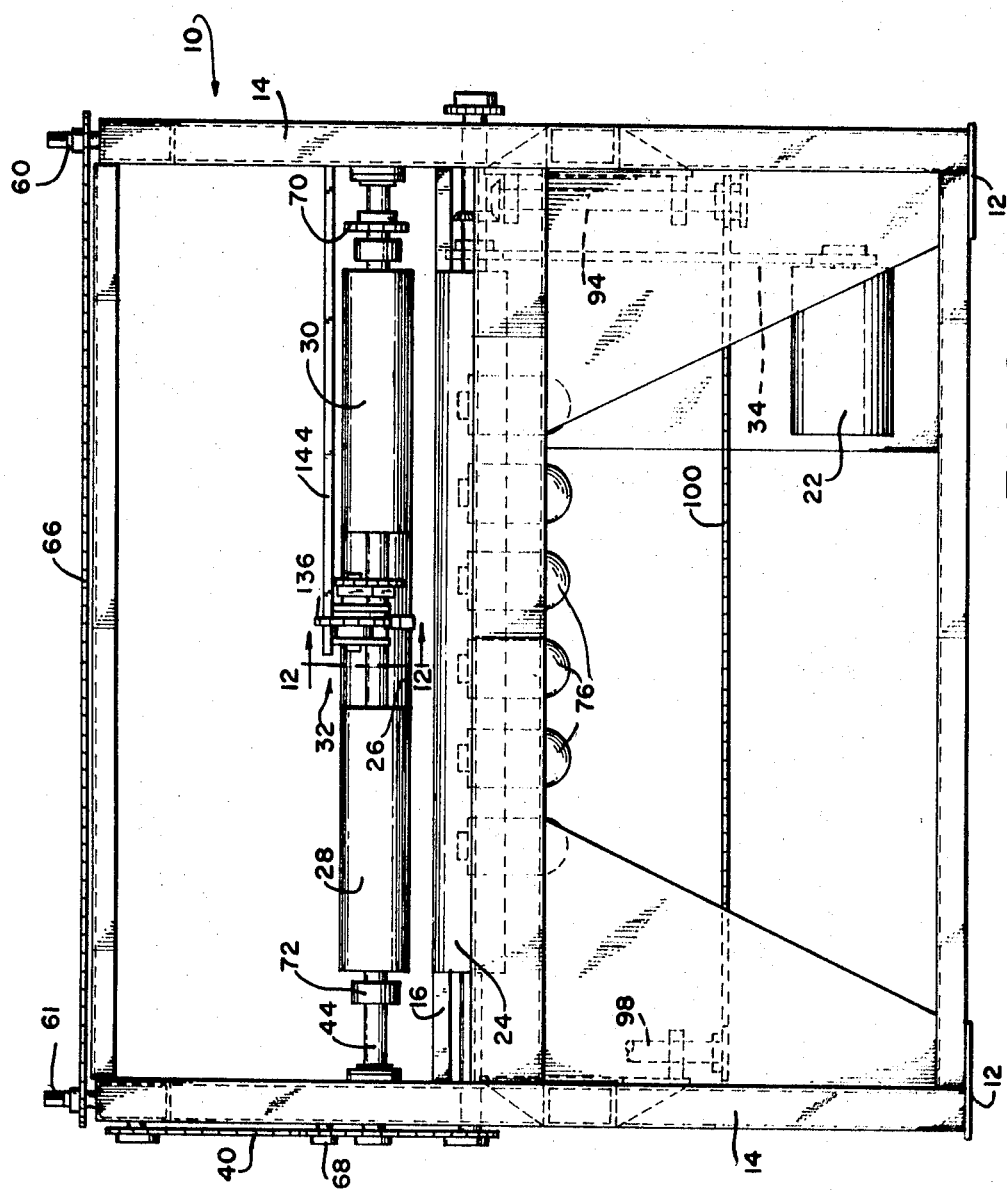
FIG. 2 is an end elevational view of the invention as shown in FIG. 1.

Referring now to the drawings by reference character, and in particular to FIGS. 1 and 2 thereof, the invention is shown including a basic frame 10, preferably constructed of rectangular steel tubing for maximum strength and minimum weight and cost. Four steel pads 12 support corner columns 14 of frame 10. A central work area platen 16 is secured above lateral rails 18 of frame 10 by posts 20. A power source 22, preferably in the form of a suitable electric motor, is mounted on the lower portion of one corner column 14.

A feed-roll assembly moves panels through the invention and includes a pair of bottom feed rolls 24, 24, three top feed rolls 26, 26, 26, and a primary top-feed-roll assembly including a left-hand feed roll 28, and a right-hand feed roll 30 (FIG. 2). The index-panel-feed system 32 which is located between rolls 28 and 30, will be discussed below. Each bottom feed roll 24 is rigidly supported on each end by suitable, rigid ball bearing pillow blocks 31, 31. Rolls 24, 24, are positively driven from motor 22 by means of a primary chain drive and sprocket assembly 34 to axle 36 of one feed roll 24; the other roll 24 is driven in synchronous relationship from axle 36 by secondary chain drive and sprocket assembly 38.

The upper outer roller 26 as well as primary top-feed rolls 28 and 30 are driven from axles 36 of bottom rolls 24 by sprocket and chain drive assemblies 40, 40, connected to axles 42 of roller 26 and axle 44 of primary feed rolls 28 and 30. Axles 42 and 44 are mounted each in a pair of slotted pillow-bearing blocks 46, 46, which ride on pairs of vertical rails 48, 48, (FIG. 1). Blocks 46, 46 are vertically adjustable so that the distance between the top and bottom feed rollers may be varied to fit panels of different thicknesses passing through the invention.

Vertical adjustment means for all the top rollers comprise a pair of movable, horizontal support frames 50 having depending rod supports 52 therein which are rigidly secured to blocks 46, for the outside rollers, and bearing blocks 54, for the inside-roll axles 56, 56 of inside rolls 26, 26. Each rod 52 is spring mounted in frame 50 by a compression spring 58, to impart downward pressure to the top rollers as a panel passes through the invention. Each frame 50 is suspended by a pair of threaded adjustment shafts 60, 60, threaded to internal connecting blocks 62, 62 of frame 50. Synchronous movement of all shafts 60 from pilot shaft 61, which is squared at 64 to receive a suitable wrench, is accomplished by chain and sprocket linkages 66. Each chain and sprocket assembly 40 includes an idler sprocket 68, mounted on slotted blocks 46 so that drive connection of the chain is not disrupted during vertical adjustment of the top-feed rolls by movement of frames 50.

Figure 3:
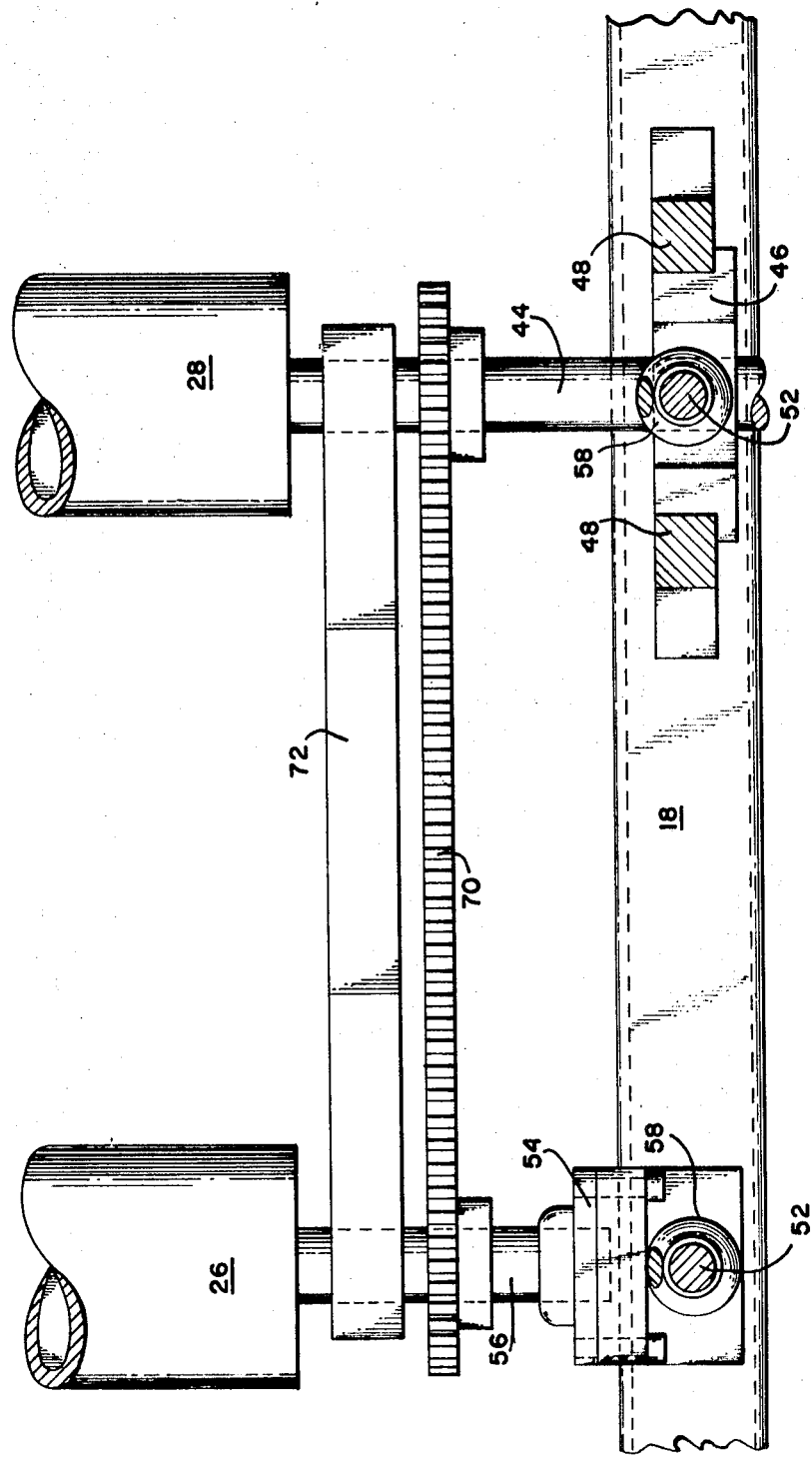
FIG. 3 is a partial top sectional view taken along lines 3—3 of FIG. 1, and drawn to an enlarged scale.
Figure 4:
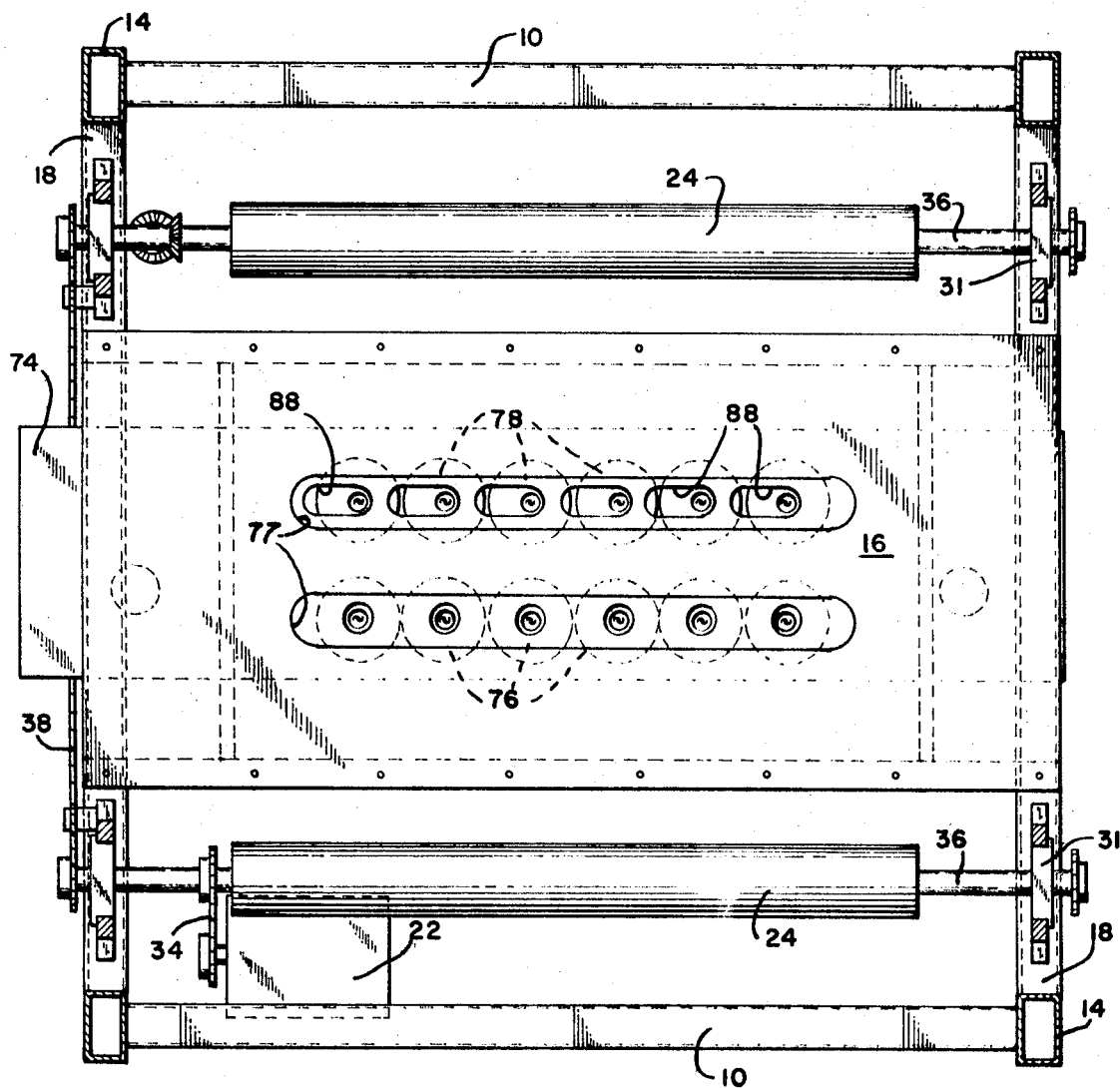
FIG. 4 is a top sectional plan view of the invention, taken along lines 4—4 of FIG. 1, illustrating the central work area of the machine.

The two top inside rolls 26, 26, may be moved from their normal position so that a panel may be handworked in the central area of work platen 16. As shown in FIGS. 1 and 3 normally each inside-roll axle 56 is driven from outboard axles 42 or 44 by chain and sprocket linkage 70. When desired inside axles 56 may be detached from their bearing blocks 54, and pivoted upwardly about axle 42 or 44 by radial arms 72, which may be powered by hydraulic power (not shown) or other suitable means. When work is finished, arms 72 may be lowered blocks 54 reconnected to their axles 56, and panels may again be fed through the invention.

Figure 5:
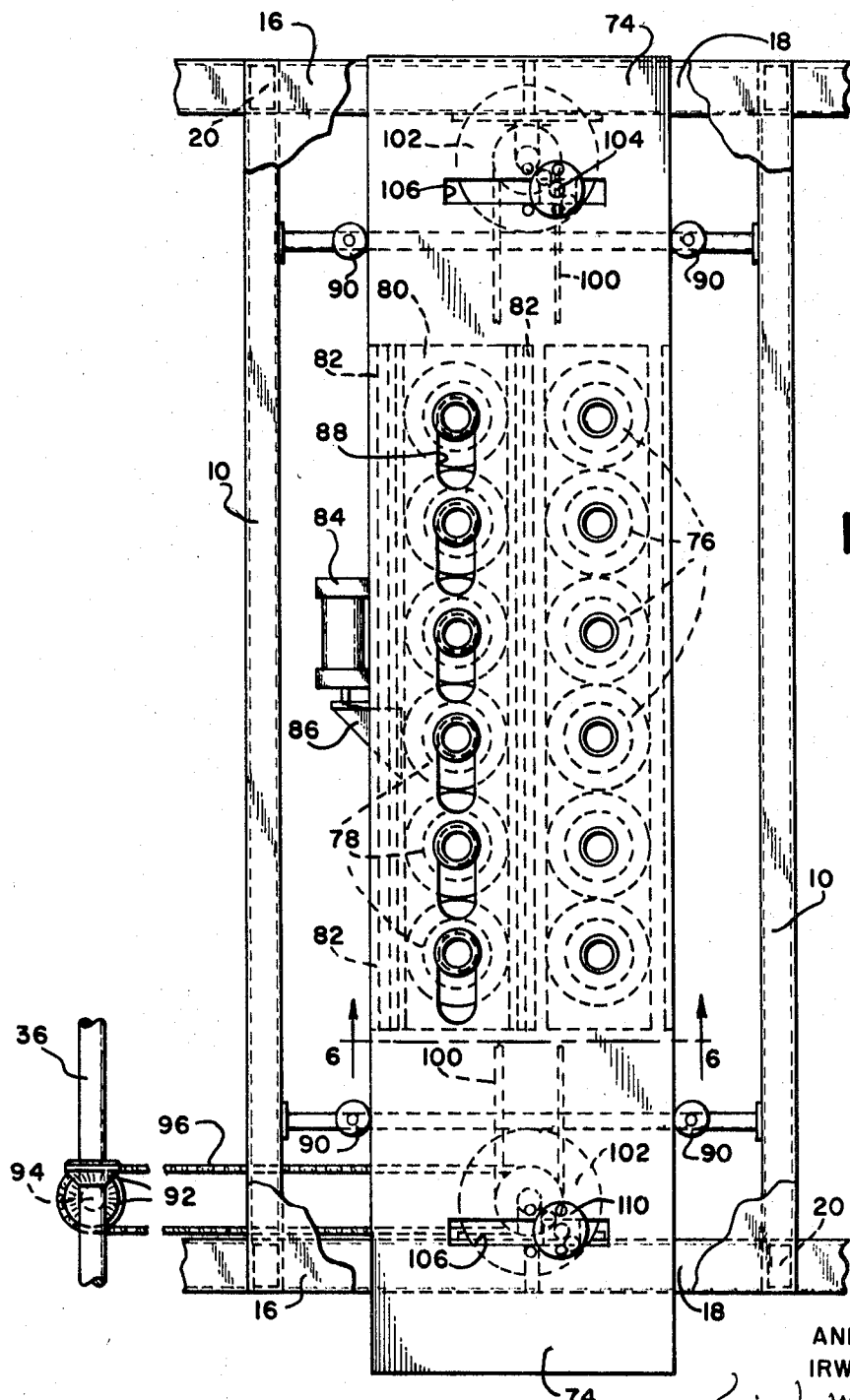
FIG. 5 is an enlarged, plan view taken from the central portion of FIG. 4.
Figure 6:
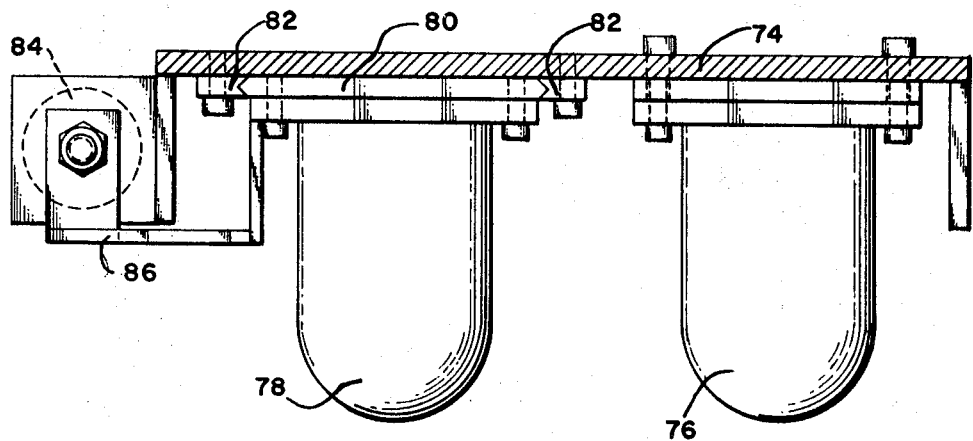
FIG. 6 is a sectional view taken along lines 6—6 of FIG. 5.

Turning now to FIGS. 4 through 11, the laterally longitudinally, and vertically movable cutter means for scoring the panel will be discussed. Beneath central work platen 16 is located a cutter support plate 74 mounted for reciprocating movement transversely of the direction of path of travel of a panel through the invention. A bank of forward routers 76 are fixed beneath plate 74, with their bit ends protruding through plate 74 and opening 72 in platen 16 to contact the panel to be worked. A rear bank of routers 78 are movable relative to support plate 74, in that each is fixed to a sliding V-indented plate 80, secured beneath plate 74 in rails 82, 82 (FIG. 6). An hydraulic or pneumatic cylinder 84 is attached at one side of plate 74 and includes a piston rod secured to sliding plate 80 at 86. The bits of routers 78 extend through slots 88 formed in plate 74, and elongated to allow linear adjustment of routers 78 with respect to plate 74. Of course, hydraulic or pneumatic cylinder 84 includes the usual, suitable controls (not shown).

The linear distance, along panel travel between a centerline drawn through movable routers 78, is exactly one-half the circumference of one feed roll 24, 26, 28, or 30, which are all of equal diameter and circumference. In this way, if plate 74 reciprocates as a panel passes through the machine, and individual pairs router bits of routers 76 and 78 are aligned parallel to the path of travel of a panel through the invention, then a braid pattern may be effectively and aesthetically varied if the timing of the reciprocation of plate 74 with respect to the speed of revolution of the feed rolls is varied. In like manner, the pattern cut into the panel may be further varied by offsetting mating pairs of routers 74 and 76 by operation of cylinder 84 to move the bank of routers 78 to a different position with respect to fixed routers 76.

Figure 7:
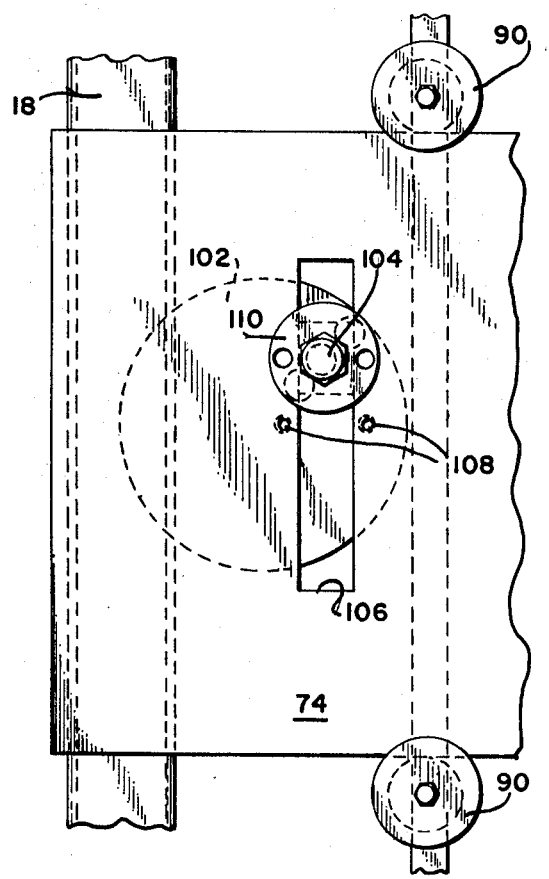
FIG. 7 is a sectional view taken along lines 7—7 of FIG. 1.
Figure 11:
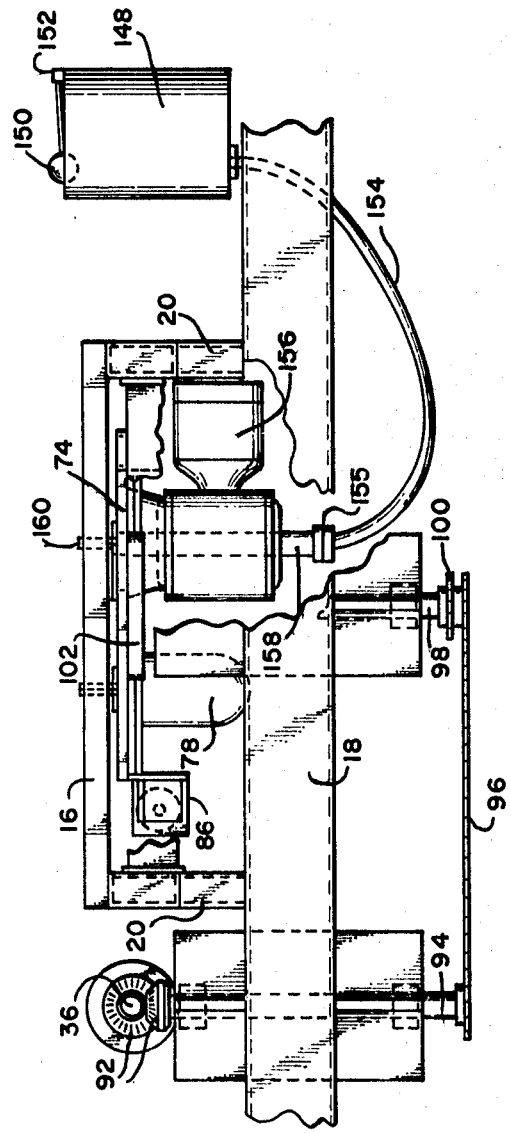
FIG. 11 is a partial end view, similar to FIG. 10, with parts broken away to show interior detail.

Reciprocal movement of plate 74 is attained by provision of horizontal restraining wheels 90, 90, 90, 90, which abut longitudinal side edges of plate 74 (FIGS. 5 and 7). Referring to FIGS. 5, 10, and 11 in particular, drive power for plate 74 is provided by a drive train from forward axle 36 by a pair of bevel gears 92, 92, a primary rotatable vertical shaft 94, plate drive primary chain and sprocket linkage 96, a secondary pair of rotating vertical shafts 98, 98 and secondary plate drive shaft chain and sprocket linkage 100 and interconnecting shafts 98, 98 for synchronous rotational movement. In the preferred embodiment, gear ratios are determined to provide a 1 to 1 rotation ratio of axle 36 to vertical shafts 98, 98 for synchronous rotational movement of these members. A pair of circular drive plates 102, 102 are secured at the top of shafts 98, 98, one to each shaft, and each plate 102 includes a vertical pin 104, freely rotatably secured to plate 102. Plate 74 is laterally slotted to each end at 106 to receive pins 104. Obviously, as plates 102 rotate, plate 74 is reciprocally driven by the action of pins 104, 104 in slots 106, and by the linear restraining action of wheels 90.

If desired, plate 74 may be adapted to move in a circular path by removing restraining wheels 90, and securing pins 104 to plate 74 at 108 by a pair of screws (now shown) through mating holes in pin flange 110 (FIG. 7). In this manner, a variety of circular designs may be scribed on a panel surface.

To vary the design pattern further, means may be provided for causing cyclical vertical motion of plate 74 as it reciprocates, or rotates as explained in the preceding paragraph. FIGS. 8 through 10 indicate a pair of inclined collars, 112, one for each vertical rotating shaft 94, which form a skewed circular track. Adjacent each collar 112 is a bracket 114, secured to a portion of frame 10, by a single bolt 116, which bracket has a pair of freely rotating guide wheels 118, 118 mounted thereon. When vertical motion of shafts 98 is not desired, wheels 118, 118 are displaced as shown in FIG. 10, so that a line drawn through axles 120, 120 of wheels 118, 118 perpendicular to collar 112, thus no lifting action occurs. To move shafts 94 vertically, bracket 114 is rotated slightly, by loosening and then tightening bolt 116, so that, as shafts 98, 98 are rotated by the drive train, wheels 118, 118, riding on collar 112, will impart slight up-and-down motion to shafts 98, 98, thence to circular drive plates 102, 102 and to plate 74 supported thereby.

Panel feed index assembly 32, illustrated in FIGS. 2, 12, and 13, is located centrally, at the forward feed end of the invention, between feed rolls 28 and 30, about axle 44. The indexing device 32 assures that the starting ends of each of a series of panels that are to be grooved identically, are in proper phase relationship with respect to the position of the routers and plate 74 at the beginning of the scribing operation. A drive sprocket 122 on shaft 44 drives sprocket 124 through roller chain 126, there being a precise 1 to 1 ratio of gear teeth between sprockets 122 and 124. Sprocket 124 is in turn mounted on primary index axle 128, to which an index sprocket 130 is secured. A secondary index axle 132 carries index sprocket 134, having the same number of teeth as sprocket 130; sprockets 130, 134 are interconnected by index roller chain 136. Integrity of index system 32 is afforded by a pair of brackets 138, 138, having ball-bearing blocks 140, 140 thereon to receive axles 128, 132. A spacing brace 142 maintains separation of brackets 138, 138, and support of brackets 138, 138 is provided by a lateral support brace 144, extending from frame 10 over feed roll 30. (FIGS. 2 and 13).

Roller chain 136 includes a series of three panel dogs 146 thereon, each equally spaced on chain 136. In a preferred embodiment of the invention, there are 36 teeth on each sprocket 130, 134, and 72 links in roller chain 136, or a 2 to 1 ratio, links to teeth. Therefore, one revolution of axle 44 will advance chain 136 its exact one-half length. Since the revolutions of feed axle 44 are phased to the reciprocation of plate 74 through drive train 40, axle 36 beneath rolls 28 and 30, bevel gears 92, and thence to vertical shaft 94, chain and sprocket linkage 96, vertical shafts 98, circular drive plates 102 and plate 74, each panel may be fed in the same relationship with respect to the leading edges of successive panels. The spacing of forward and rear router banks 76 and 78, respectively, the circumferential measurement of feed rolls 24, 26, 28, and 30, and the spacing of dogs 146 are on a numerical basis wherein the relationships are divisible by the number 4. Thus, the spacing between router banks may be 8 inches, the circumference of each roll 24, 26, 28 and 30 may be 16 inches, and the dogs 146 on chain 136 may be spaced 90° in phase with a starting point, which may be any one of the dogs 146 selected as an initial reference point. Since the advance of chain 136 is exactly one-half, or 180°, with respect to an entire revolution of axle 44, or 360°, three dogs may be used. In other words, one dog 146 moves 90° with respect to its chain 136 with each one-half revolution of axle 44, or 180° with respect to axle 44.

A final assembly that may be provided with the invention is a hollow brush paint or stain system to seal grooves formed in a panel immediately after the scribing operation, as best shown in FIG. 11. A paint or stain tank 148 is mounted on frame 10, and includes a float 150 operatively connected to a feed valve 152, which is in turn connected by a feedline (not shown) to a steady paint or stain supply source (not shown) under pressure. Float 150 and valve 152 maintain a steady level of paint or stain in tank 148.

A feedline 154 directs paint from tank 148 through a hollow universal coupling 155 to a motor 156, which rotates a paint-supply shaft 158 located centrally thereon. Shaft 158 includes a hollow brush 160 thereon, protruding through plate 74 and work platen 16 to contact a groove formed in a panel. Of course, a series of hollow brushes may be provided across the length of work platen 16 in order to treat the entire panel. Alternatively, a spray system (not shown) may be employed to seal the scribed panel surface.

It is readily apparent that we have invented a new and highly useful panel-grooving machine, and therefore, we are not to be limited to the exact construction as hereinbefore provided, except as may be deemed to be within the scope of the following claims.

I claim:

1. An apparatus for treating the surface of a panel of wood or like material, comprising:
    a. a frame structure;
    b. a work platen supported thereby;
    c. banks of feed rolls mounted on either side of the work platen for transporting panels through the apparatus; and
    d. cutter means adjacent the platen for treating the panel, movable linearly and transversely with respect to the path of travel of a panel through the apparatus, comprising:
        1. a plate support, movable beneath said work platen;
        2. a plurality of routers arranged in at least two banks on said plate support, the bits thereof extending upwardly through said plate support and said work platen; and
        3. means for reciprocating said support plate linearly and transversely of the path of travel of a panel through the apparatus.

2. The apparatus of claim 1 wherein said apparatus further includes a power source, and a drive train from said power source driving each of said banks of feed rolls at a uniform, synchronous speed.

3. The apparatus of claim 1, wherein the banks of feed rolls comprise:
    a. a lower bank of feed rolls having working surfaces generally coplanar with said work platen; and
    b. an upper bank of feed rolls, each resiliently mounted vertically for biasing a panel downwardly as it passes through the apparatus, and means for simultaneously adjusting the upper banks of feed rollers vertically to accommodate varying thicknesses of panels.

4. The apparatus of claim 3 wherein said means for simultaneously vertically adjusting said upper bank of feed rolls comprises:
    a. a movable support frame suspending each of said upper bank of feed rolls;
    b. a plurality of shafts freely rotatably mounted in said frame structure and threadably engaging said movable support frame; and
    c. linkage means interconnecting said shafts whereby upon rotation of one of said shafts, all of the shafts are rotated simultaneously to raise and lower said movable support frame.

5. The apparatus of claim 3 wherein said upper bank of feed rolls includes a pair of feed rolls adjacent said work platen, and means for moving said work platen feed rolls away from said work platen, each comprising:
    a. a pair of rigid support arms extending from an adjacent, outer feed roll, and freely rotatably supporting said work platen feed roll; and
    b. means for disconnecting said work platen feed roll from said means for simultaneously vertically adjusting the upper bank of feed rolls, whereby said work platen feed roll may be rotated, upwardly, about the axis of said adjacent, outer feed roll.

6. The apparatus of claim 1 wherein one of said banks of routers includes means for adjusting said bank along the said support plate at right angles to movement of the panel being worked.

7. The apparatus of claim 6 wherein said means for adjusting one of said banks of routers comprises:
    a. a sliding plate, mounting said routers, located beneath said support plate;
    b. a pair of longitudinal rails for said sliding plate; and
    c. means for moving said sliding plate in said rails.

8. The apparatus of claim 1 wherein said means for reciprocating said support plate comprise:
    a. a pair of vertical, rotating shafts;
    b. a pair of circular drive plates, one secured on top of each vertical shaft;
    c. a pair of drive pins, one mounted on each drive plate near the periphery thereof; and
    d. means defining a pair of transverse slots in said support plate, one for each pin, whereupon rotation of said shafts, said pins move said support plate.

9. The apparatus of claim 8 wherein said pins are secured to said support plate to move said plate in a circular fashion, linearly and transversely with respect to the path of travel of a panel through the apparatus.

10. The apparatus of claim 8 wherein said support plate is provided with wheel restraining means on each longitudinal side thereof, restricting movement of said support plate to a direction transversely of said path of travel of a panel through the apparatus.

11. The apparatus of claim 8 wherein said support plate is provided with means for vertically moving the support plates comprising:
    a. a pair of rings, one formed medially around each vertical rotating shaft, a plane drawn through said ring crossing the axis of said rotating shaft at an angle less than 90°; and
    b. a pair of restriction wheels for each ring, located one on each side thereof, a line drawn through the axes of rotation of the restriction wheels crossing a plane drawn through the ring at an angle less than 90° whereupon rotation of the vertical shaft, said restriction wheels impart a cyclical, vertical motion to the shaft; and
    c. means for moving said restriction wheels to an inoperative position.

12. The apparatus of claim 3 wherein said upper bank of feed rolls further includes a primary feed roll system comprising:
    a. a pair of primary feed rolls, one on each side of the longitudinal center line of an apparatus, having a common axle; and
    b. an index feeding system located between said primary feed rolls, including:
        1. a pair of auxiliary axles, one on each side of said common axle;
        2. drive train means from said common axle to the auxiliary axles;
        3. a pair of sprockets, one on each auxiliary axle;
        4. a roller chain about said sprockets; and
        5. a plurality of dogs spaced on said roller chain for feeding a panel into the apparatus.

13. The apparatus of claim 12 wherein said plurality of dogs are three in number, spaced evenly on said roller chain, said sprockets having the same number of teeth and a gear ratio of 1 to 2 with respect to said axle, whereby a single rotation of said axle, said roller chain rotates one-half turn.